United States Patent [19]

Baer et al.

[11] Patent Number: 4,545,045

[45] Date of Patent: Oct. 1, 1985

[54] RECORDING DISK LOAD AND UNLOAD APPARATUS

[75] Inventors: James R. Baer, Broomfield; Kenneth Manes, Lafayette; Harold Lunka, Broomfield, all of Colo.

[73] Assignee: Storage Technology Partners II, Louisville, Colo.

[21] Appl. No.: 499,750

[22] Filed: May 31, 1983

[51] Int. Cl.[4] .......................... G11B 3/36; G11B 17/04
[52] U.S. Cl. ...................................... 369/77.2; 414/416
[58] Field of Search ........................ 369/77.2, 77.1, 34, 369/36, 37, 38, 39, 40; 271/225, 184; 414/416

[56] References Cited

U.S. PATENT DOCUMENTS

| | | | |
|---|---|---|---|
| 4,249,342 | 9/1977 | Hearon | 271/184 |
| 4,273,342 | 6/1981 | Gilson et al. | 369/39 |
| 4,426,695 | 1/1984 | Moriki et al. | 369/77.2 |
| 4,479,210 | 10/1984 | Nakayama | 369/75.2 |

Primary Examiner—Steven L. Stephan
Attorney, Agent, or Firm—Ronald Williams; Bryant R. Gold; James R. Young

[57] ABSTRACT

An automatic load/unload apparatus is disclosed for handling of workpieces that must be removed from protective cartridges prior to use. In particular, the workpiece to be handled is an optical disk adapted for use in an optical disk information storage device. The load/unload apparatus includes a guide frame, a cartridge pull-in tray, a cartridge insert separator, reciprocating means for moving the pull-in tray and separator, and an elevator assembly. During a load operation, the cartridge is inserted into the information storage device wherein the load/unload apparatus is housed. The cartridge is received in the guide frame and opened, allowing the pull-in tray to be slideably removed. The disk is separated from the pull-in tray and raised by the elevator assembly to a desired position. An unload operation proceeds in a reverse sequence.

3 Claims, 6 Drawing Figures

RECORDING DISK LOAD AND UNLOAD APPARATUS

BACKGROUND OF THE INVENTION

The disclosed invention, a recording disk loading and unloading apparatus, relates to the field of disk handling devices, and in particular to automatic loading of disks within information storage devices.

In the prior art, there have been a wide number of means developed for the non contact handling of workpieces, such as information recording disks. However, as information has become more densely written on the disk surface, the sensitivity of the disk to contamination by dust and damage during handling has dramatically increased. The opportunity for contamination or damage of the disk surface primary arises during the loading or unloading of the disk in the recording device. This sensitivity is more critical with digital information disks, both magnetic and optical, than other information storage media.

Exposing the disk surface to the open atmosphere usually results in serious contamination of the disk surface. Therefore, in devices having removable media, it is essential that the disk be kept in a protective covering when not actually loaded in the recording device. Also, disk damage and contamination as a result of human error during the loading and unloading of the disk into the device is an ever present concern.

Some prior art has addressed these problems, in part, by having the disks permanently stored in the device. In other prior art, where the disk is removable, disk cartridges have been developed to prevent the contamination or damage to the disk while outside the machine.

The present invention is designed for use with such a disk cartridge, in an information storage device having the capability of using removable media. This invention is able to automatically remove the recording disk from its cartridge and present the recording disk for mounting on the recording device spindle. The invention reverses the procedure for automatically returning the disk to its' protective cartridge.

It is an object of this invention to provide a means for loading a recording disk into a recording device such that the exposure of the disk to contamination is minimized.

It is another object of this invention to provide a means for automatically loading and unloading recording disks in information storage devices.

It is yet another object of this invention to provide a means for automatically transferring a disk from a multi-disk storage system into the information storage device.

BRIEF SUMMARY OF THE INVENTION

This invention is an automatic load/unload apparatus for use in any device which requires the automatic handling of workpieces that must be removed from their protective cartridges prior to use. In the preferred embodiment, the load/unload apparatus is used to move a disk cartridge into the device, remove the disk from the cartridge and present the disk to the device spindle for use.

The load/unload apparatus is comprised of a guide frame, a cartridge pull-in tray, a cartridge insert separator, a means for reciprocatively moving the pull-in tray and separator, and an elevator assembly. The guide frame has a first leg, which is disposed parallel to the entrance port of the device, said first leg acting as the front support for a manually introduced cartridge, and a second leg which is perpendicular to the first leg and which supports a first side of the disk cartridge during and after loading. The second leg has a first set of holes which allow the vertical passage of a set of cartridge insert release cams, with these cams being connected to a means for selectively raising and lowering them. The second leg also acts as the front support for an automatically introduced cartridge, such as when the device is connected to a disk jukebox type cartridge storage and retrieval system wherein the cartridge is automatically introduced into the device by the jukebox type system.

The cartridge pull-in tray is oriented parallel to the first leg of the guide frame and reciprocates in a forward/backward movement, toward and away from said first leg, by any known moving means, such as a solenoid, gear arrangement, or a linear motor. During insertion, the cartridge housing is clamped to the pull-in tray by means of a first set of clamping pins, said pins passing through a second set of holes in the lower arm of the tray, said clamping pins being moved into contact with said housing also by such moving means as described above.

The cartridge insert separator is disposed normal to the entrance port and is moved toward and away from said second leg by such moving means as previously described. A cartridge insert, disposed within the cartridge housing, supports the disk. The cartridge insert is clamped to the cartridge insert separator and then extracted from the housing by the outward movement of the separator. The cartridge insert is clamped to the cartridge insert separator between the upper arm of the separator and a second set of pins, said pins passing through a third set of holes in the lower arm of the separator, and vertically reciprocated by a moving means as previously described. When the cartridge insert separator is fully extended, the disk is disposed over an elevator platform.

In operation, the machine operator manually introduces the disk cartridge into the entrance port of the device. The partly inserted cartridge rests on the front leg of the guide frame, with the inserted portion inside the cartridge pull-in tray. Initially the cartridge pull-in tray is in a position nearest the first leg. Upon activation of the apparatus by the operator, the first set of clamping pins is moved upward to engage a slot in the bottom of the cartridge housing, clamping the housing between the pins and the upper arm of the pull-in tray. After the housing is clamped to the pull-in tray, the pull-in tray is pulled rearward, moving the cartridge completely into the recording device. After the cartridge is fully inserted, the cartridge insert handle, located on the side of the cartridge adjacent to the cartridge insert separator, is fully inside the arms of the cartridge insert separator. The insert separator pins are then raised, clamping the cartridge insert handle to the cartridge insert separator. At the same time, the cartridge insert release cams located in the second leg of the guide frame are activated to release the cartridge locks holding the cartridge insert in the cartridge housing. After the cartridge locks are released, the cartridge insert separator is moved away from the cartridge housing, removing the cartridge insert from the cartridge housing. After the cartridge insert is fully extended, the disk is disposed over an elevator assembly. The cartridge insert has a center opening small enough to support the disk, but large enough to allow passage of the elevator platter. The elevator motor is then activated, raising the platform upward to engage and lift the disk from the cartridge insert. The platform continues upward until the disk contacts the device spindle for rotation.

To unload the disk from the device, the above described procedures are reversed.

By keeping the cartridge housing, which has contamination on its exterior, away from the data sensing means of the device, damage and contamination of the disk and data sensing means is minimized.

DETAILED DESCRIPTION OF THE PREFERRED EMBODIMENT

Figure 1:
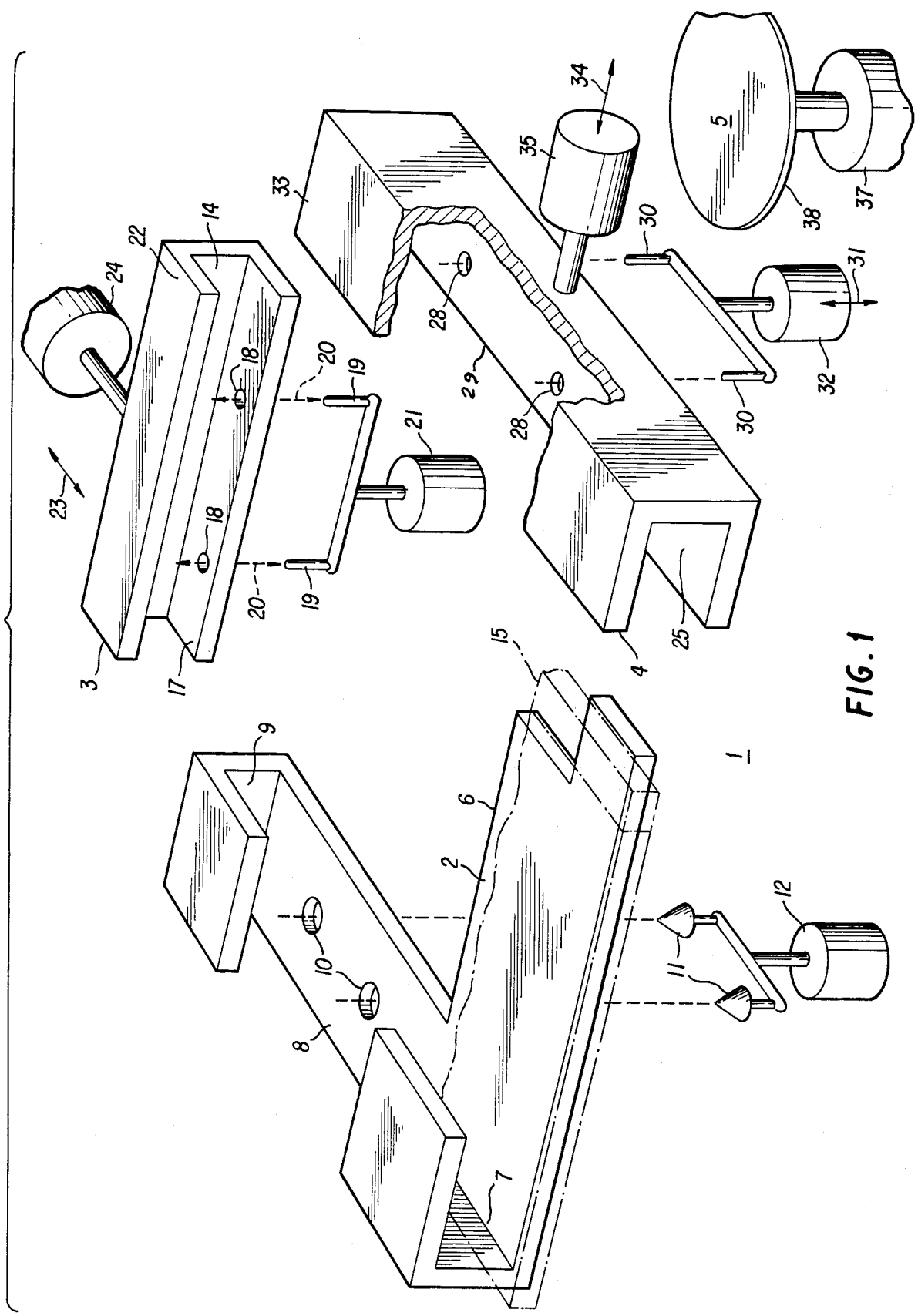
FIG. 1 is an exploded pictorial representation of the disclosed invention, showing the basic elements thereof.

FIG. 1 shows the preferred embodiment with the load/unload mechanism 1 exploded into its major components, the guide frame 2, the pull-in tray 3, and the cartridge insert separator 4. Also shown is the elevator assembly 5 for moving the disk to the device spindle for use. The guide frame 2 has a first leg 6, which has a rectangular shaped opening 7, through which a manually loaded cartridge 15 (shown in FIG. 2) is introduced. This opening 7 is in communication with the manual entrance port of the device. The second leg 8 of the guide frame 2 also has an opening 9, through which a cartridge is introduced from a jukebox type system. The second leg 8 has a first set of holes 10 for the passage of the cartridge insert release cams 11. The cams 11 are reciprocated in an upward and downward motion by any well known means, here represented by motor 12.

Figure 2:
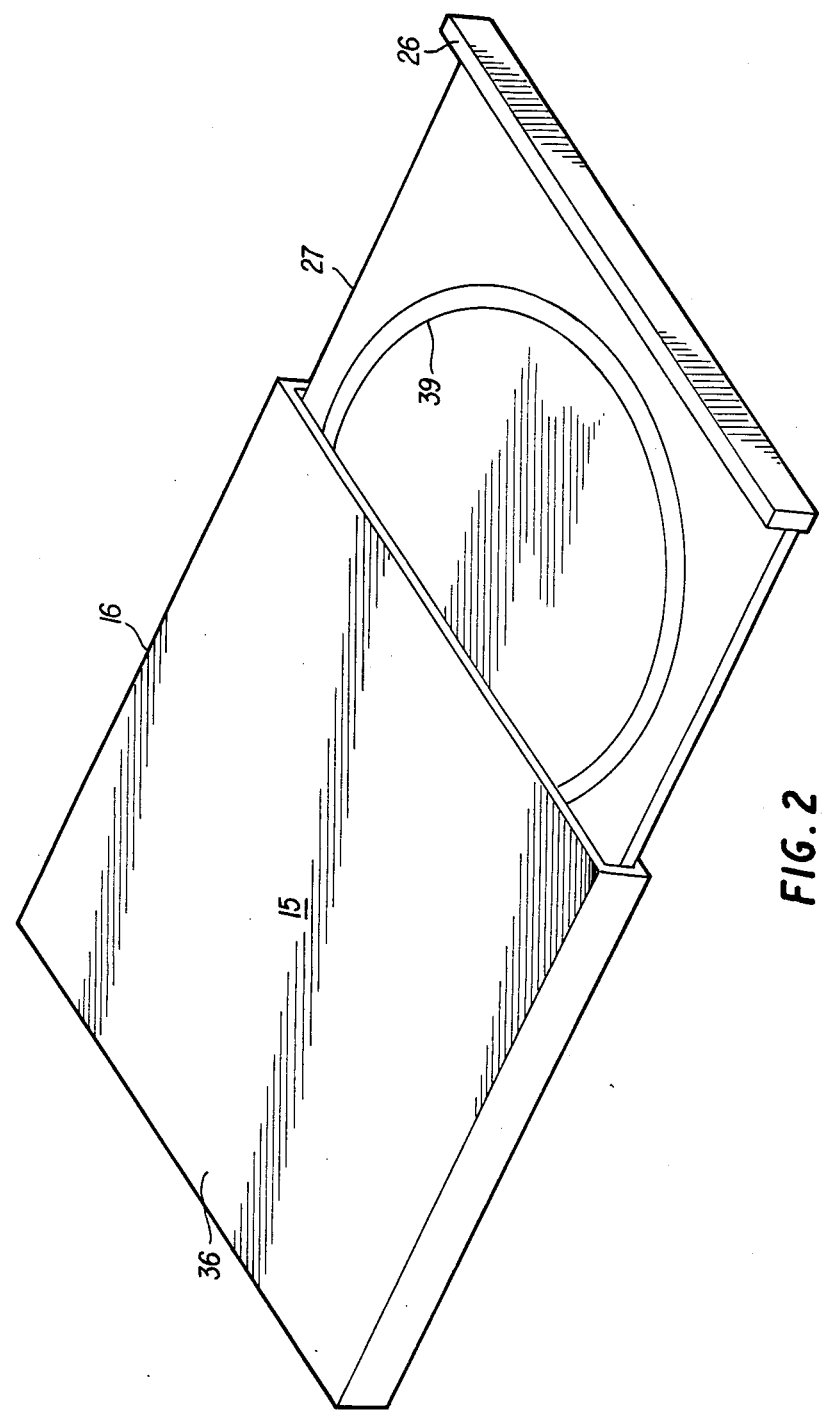
FIG. 2 is a pictorial representation of a cartridge showing the cartridge housing and the cartridge insert.

As shown in FIGS. 1 and 2, the U-shaped pull-in tray 3 has an interior channel 14, into which a cartridge 15 is manually introduced. The leading edge 16 of the cartridge 15 rests between the arms 17 and 22 of the U-shaped pull-in tray 3 and is disposed parallel to the manual entrance port of the device. The lower arm 17 of the pull-in tray 3 has a second set of holes 18 for the passage of a first set of clamping pins 19. The clamping pins 19 are reciprocated in an upward and downward direction, as shown by arrow 20, by any well known means, here represented by a second motor 21. When the pins 19 are in an upward position, the leading edge 16 of the cartridge 15 is clamped between the upper arm 22 of the pull-in tray 3, and the pins 19. The pull-in tray 3 is reciprocated in a forward and rearward direction, illustrated by arrow 23, by any well known means, here represented by a third motor 24.

As shown in FIGS. 1 and 2, the cartridge insert separator 4, is disposed normal to the entrance port of the device, and has an interior channel 25 into which the insert handle 26 of the cartridge 15 is moved as the cartridge 15 is pulled into the information storage device. The cartridge insert handle 26, attached to the cartridge insert 27, rests in the separator channel 25. As shown in FIG. 1, the cartridge insert separator 4 has a third set of holes 28 in the lower arm 29, for the passage of a second set of clamping pins 30. The clamping pins 30 are reciprocated in an upward and downward direction, indicated by arrow 31, again by any well known means, here represented by a fourth motor 32. When in an upward position, the clamping pins 30 clamp the cartridge insert handle 26 between the upper arm 33 of the cartridge insert separator 4 and the clamping pins 30. The cartridge insert separator 4 is moved in a reciprocating direction, as shown by arrow 34, by any well known means, here represented by a fifth motor 35. In its most retracted position, the cartridge insert separator 4 extracts the cartridge insert 27 from the cartridge housing 36 and positions the cartridge insert 27 over the elevator assembly 5, such that the elevator motor 37, upon activation, raises the elevator platform 38 upward to engage a disk (not shown) laying in the insert 27, raising the disk out of the cartridge insert 27 and, moving the disk to the device spindle for use. The cartridge insert 27 has an opening 39 large enough to allow the platform 38 to pass, but small enough to support the disk.

Figure 3:
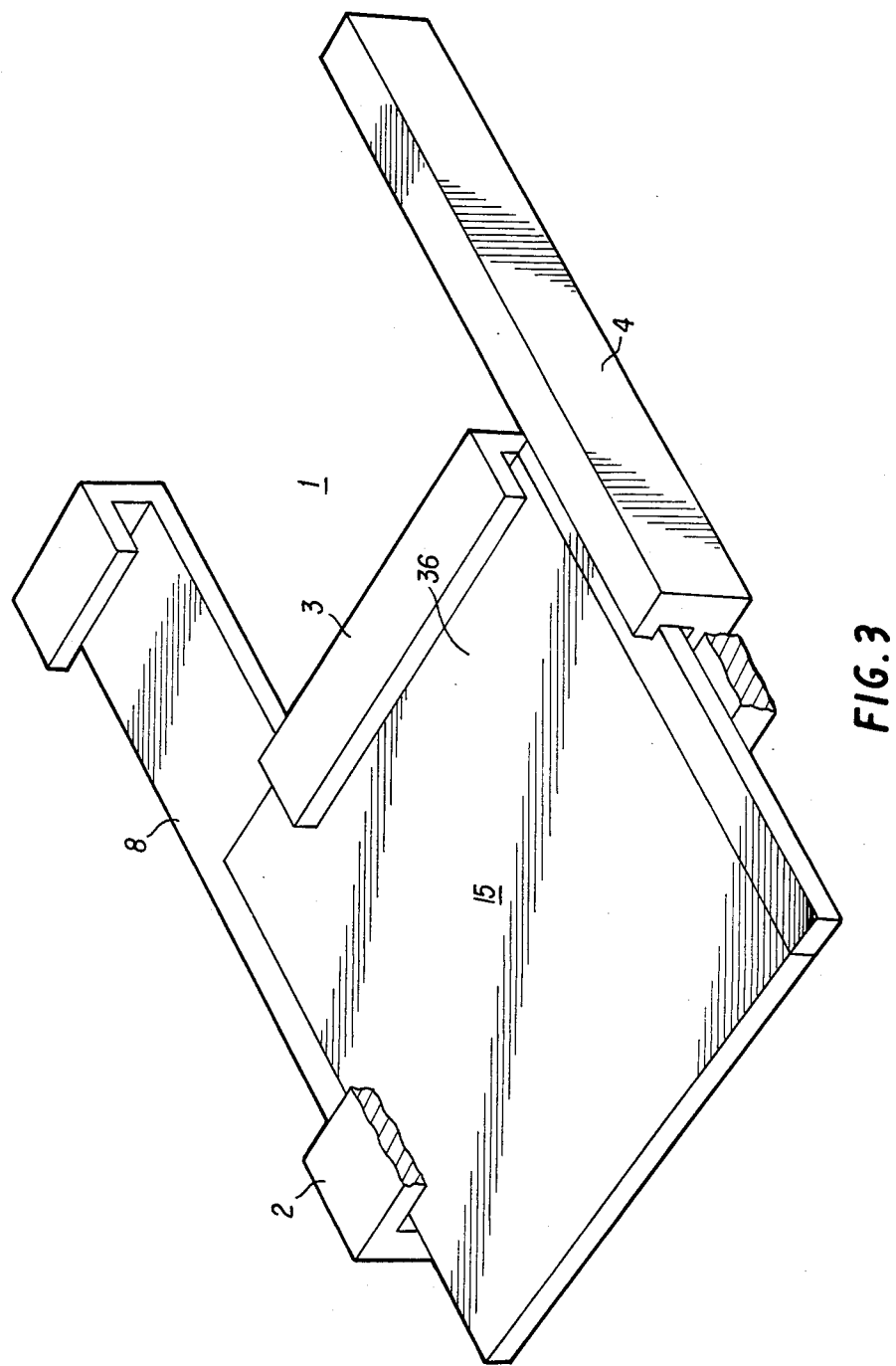
FIG. 3 is a pictorial representation of the preferred embodiment of the disclosed invention configured for use with an optical recording disk, showing the disk cartridge introduced into the load/unload apparatus.
Figure 4:
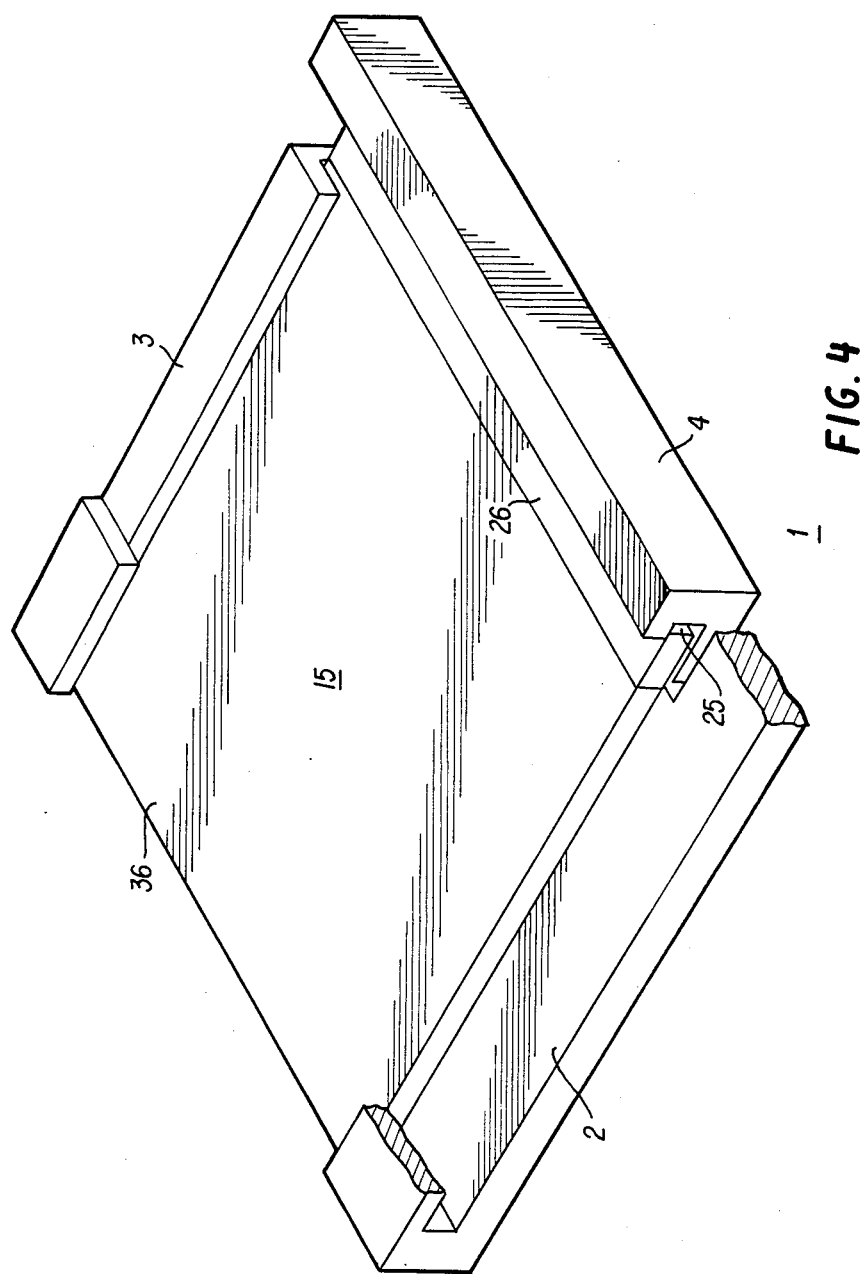
FIG. 4 is a pictorial representation of the preferred embodiment of the disclosed invention showing the cartridge fully inserted into the load/unload apparatus.
Figure 5:
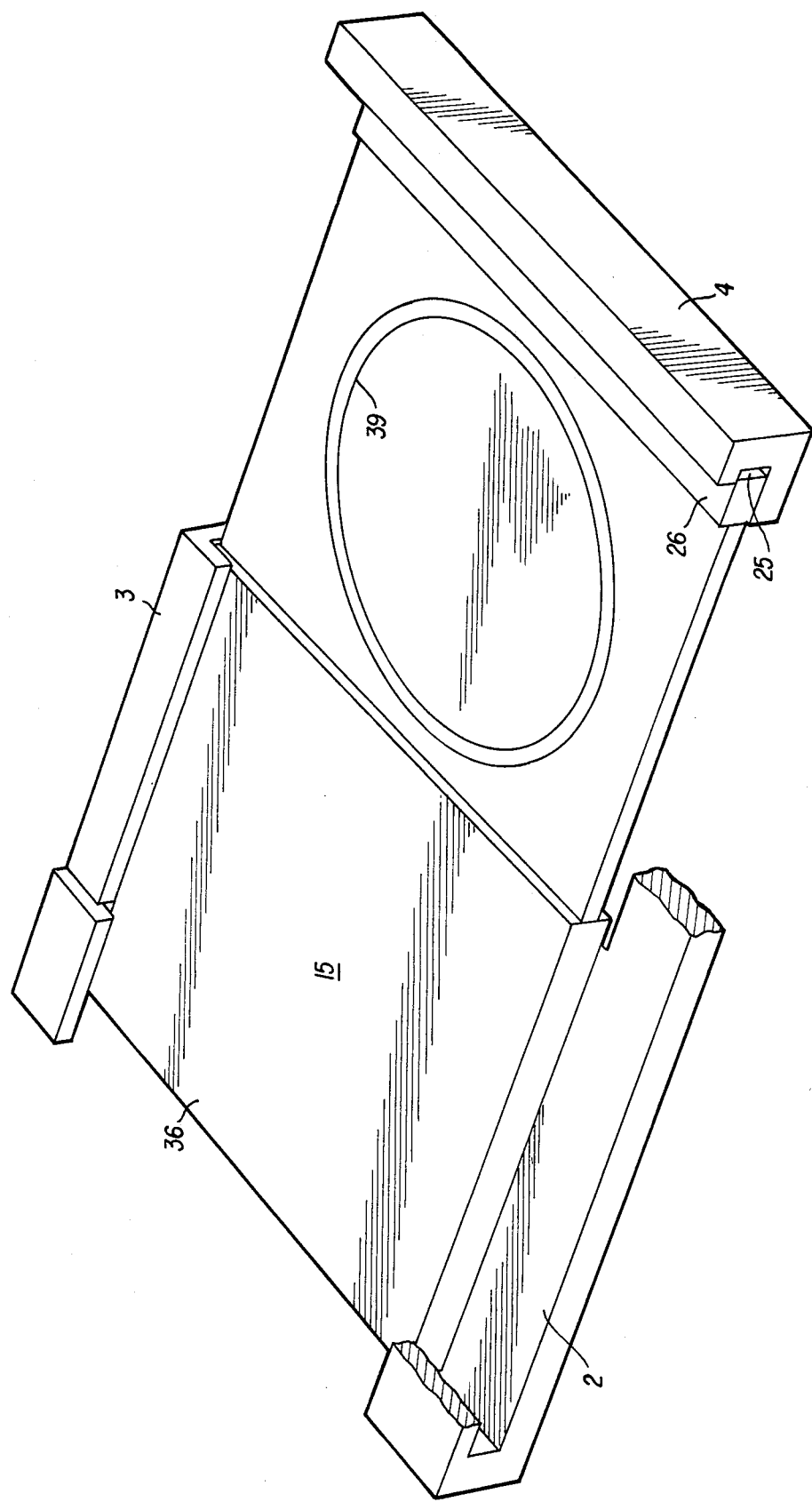
FIG. 5 is a pictorial representation of the preferred embodiment of the disclosed invention showing the cartridge insert removed from the cartridge housing.

The operation of the apparatus can be seen by reference to FIGS. 3–5. FIG. 3 shows a manually introduced cartridge 15, partially inserted into the apparatus 1. The pull-in tray 3 is in its forward-most position, engaging and supporting the cartridge 15. The insert handle 26 of the cartridge 15 is supported by the separator 4, while the remaining side of the cartridge is supported by the second leg 8 of the guide frame 2. At this point, the cartridge 15 is clamped to the pull-in tray 3, and the tray 3 then is moved rearward, pulling the cartridge 15 fully into the device.

FIG. 4 shows the fully inserted cartridge 15 with the pull-in tray 3 at its rearmost position. In this fully inserted position, the cartridge insert handle 26 is fully contained within the U-shaped channel 25 of the separator 4. At this point, the cartridge handle 26 is clamped to the separator 4 by the pins 30 (shown in FIG. 1).

As shown in FIG. 5, once clamped to the cartridge insert separator 4, the cartridge insert 27 is extracted from the cartridge housing 36 when the separator is reciprocated away from the cartridge 15. Once fully extracted, the cartridge insert 27 and in particular the insert opening 39, is positioned over the elevator assembly 5 shown in FIG. 1. The assembly 5 can then be activated, removing the disk (not shown) from the cartridge insert 27, and presenting it to the spindle (not shown) for use.

Figure 6:
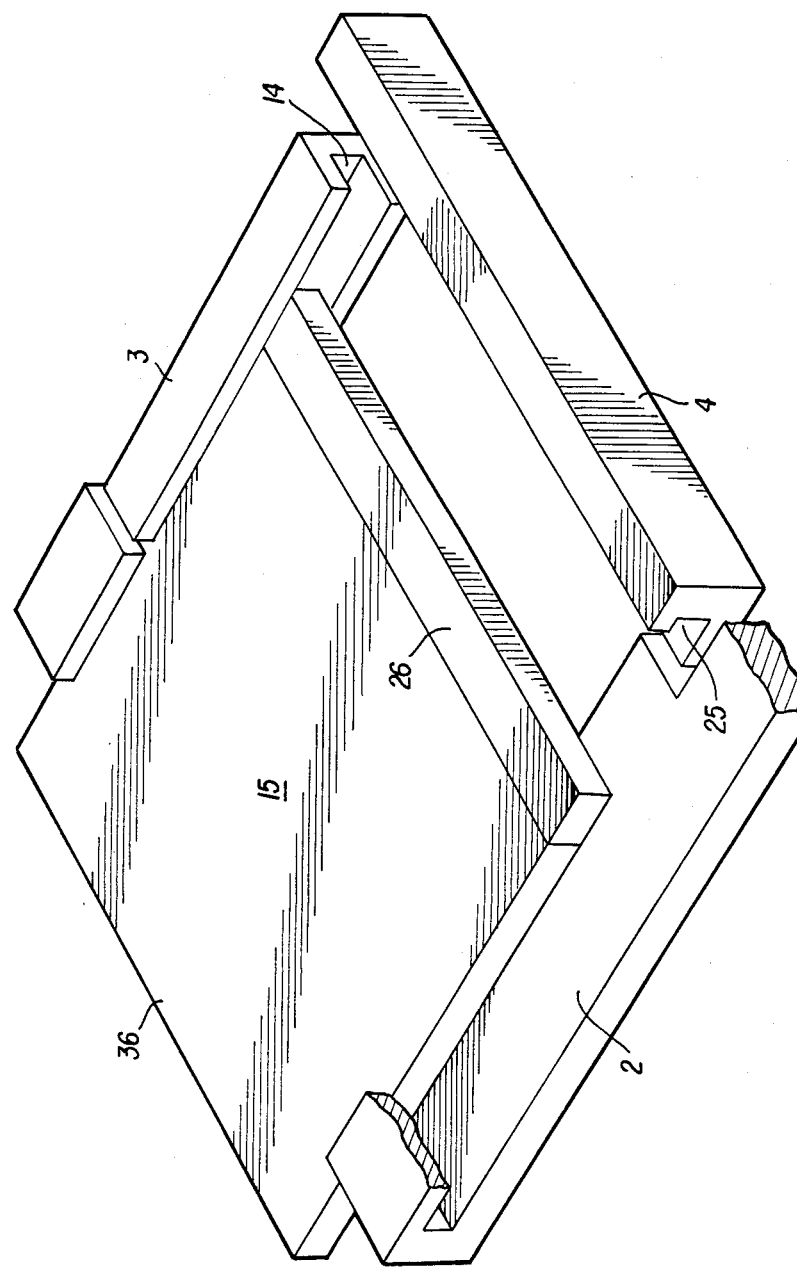
FIG. 6 is a pictorial representation of the disclosed invention showing the cartridge introduced from the side as when loaded from a jukebox type system.

FIG. 6, shows a partially inserted cartridge 15 being introduced from the side as when loaded from a jukebox type cartridge storage and retrieval system (not shown). In this configuration, the jukebox type system will fully introduce the cartridge into the information storage device, and thereafter, the loading/unloading operations are as discussed above.

While the preferred embodiment has disclosed the apparatus in conjunction with a recording disk cartridge and specific pin clamping mechanisms, those skilled in the workpiece handling arts will recognize that the disclosed invention is adaptable to a wide number of alternative configurations, and that the disclosed embodiments are in no way extended to limit or otherwise narrow the scope of this invention.

We claim:

1. An apparatus for loading and unloading a recording disk cartridge in an information storage and retrieval device, the disk cartridge having a cartridge housing and a cartridge insert, having an exterior portion, for supporting the disk when located in the disk cartridge, the cartridge insert slidably disposed within the cartridge housing and having a hole for passage of an elevator platform for lifting the disk out of the cartridge insert during loading, said loading and unloading apparatus comprising:

a guide frame for supporting and guiding a disk cartridge as the disk cartridge is loaded and unloaded in the information storage and retrieval device, said guide frame comprising:
 a first leg disposed adjacent to a manual entrance port of the information storage and retrieval device, the first leg having an opening to receive and support the disk cartridge upon the manual introduction of the disk cartridge into the entrance port, and
 a second leg for supporting the disk cartridge as the disk cartridge is automatically drawn into the device;

means for automatically pulling the disk cartridge into the information storage and retrieval device during loading and pushing the disk cartridge out of the information storage and retrieval device during unloading, said means comprising:
 a cartridge pull-in tray having upper and lower arms for receiving an innermost edge of the cartridge housing, the cartridge pull-in tray, when in a forward position and upon the manual introduction of the disk cartridge, receives the innermost edge of the cartridge housing and supports the disk cartridge during automatic loading and unloading operations;
 clamping pins disposed in holes in the lower arm of the cartridge pull-in tray, the clamping pins selectively clamping the cartridge housing between the clamping pins and the upper arm of the cartridge pull-in tray; and
 means for selectively and reciprocatively urging the clamping pins upward to clamp the cartridge housing and down to unclamp the cartridge housing;

means for automatically moving the cartridge insert in a lateral direction out of the cartridge housing, said means comprising:
 means for clamping the exterior portion of the cartridge insert; and
 means for moving the cartridge insert out of the cartridge housing during the loading operation, and pushing the cartridge insert into the cartridge housing during the unloading operation; and an elevator assembly, for vertically raising the disk from the cartridge insert during the loading operation and lowering the disk into the cartridge insert during the unloading operation, the elevator assembly having a platform which supports the disk when raised out of the cartridge insert, and the elevator assembly having moving means which selectively raises the platform during the loading operation and lowers the platform during the unloading operation.

2. The cartridge loading and unloading apparatus of claim 1, wherein the means for clamping the exterior portion of the cartridge insert is comprised of:
a cartridge insert separator having an upper arm and a lower arm with holes for passage of cartridge insert clamping pins;
cartridge insert clamping pins, which, upon upward extension, clamp the cartridge insert between the upper arm of the insert separator and the insert clamping pins, and;
means for reciprocatively moving the insert clamping pins upward to engage the cartridge insert and downward to release the cartridge insert.

3. The cartridge loading and unloading apparatus of claim 1, wherein the second leg of the guide frame for supporting and guiding the disk cartridge further comprises a rectangular opening for the automatic introduction of a disk cartridge.

* * * * *